(12) United States Patent
Cochrane et al.

(10) Patent No.: US 9,069,831 B2
(45) Date of Patent: *Jun. 30, 2015

(54) RETRIEVING DATA OBJECTS

(75) Inventors: Roberta J. Cochrane, Mount Kisco, NY (US); Ronald C. Leung, San Jose, CA (US); Louis S. W. Mau, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/543,552

(22) Filed: Jul. 6, 2012

(65) Prior Publication Data

US 2012/0278306 A1 Nov. 1, 2012

Related U.S. Application Data

(63) Continuation of application No. 13/074,472, filed on Mar. 29, 2011.

(51) Int. Cl.
*G06F 17/30* (2006.01)

(52) U.S. Cl.
CPC ................. *G06F 17/30572* (2013.01)

(58) Field of Classification Search
CPC .............. Y10S 707/99944; G06F 17/3056; G06F 17/30716; G06F 9/4443
USPC .......................................... 707/754, 999.003
See application file for complete search history.

(56) References Cited

U.S. PATENT DOCUMENTS

| 6,754,670 | B1 | 6/2004 | Lindsay et al. | |
|---|---|---|---|---|
| 7,296,028 | B1 | 11/2007 | Ivanova | |
| 7,523,131 | B2 | 4/2009 | Warner et al. | |
| 7,747,657 | B2 | 6/2010 | Singh | |
| 2004/0236767 | A1 | 11/2004 | Soylemez et al. | |
| 2005/0004904 | A1 | 1/2005 | Kearney et al. | |
| 2005/0278282 | A1* | 12/2005 | Sheridan | 707/1 |
| 2007/0043699 | A1* | 2/2007 | Zhang | 707/3 |
| 2007/0260582 | A1* | 11/2007 | Liang | 707/2 |
| 2008/0189240 | A1 | 8/2008 | Mullins et al. | |
| 2009/0043733 | A1 | 2/2009 | Kingsford et al. | |

(Continued)

FOREIGN PATENT DOCUMENTS

CN 101067814 A 11/2007

OTHER PUBLICATIONS

English Abstract for CN101067814A, published on Nov. 7, 2007, Total 1 p.

(Continued)

*Primary Examiner* — Yuk Ting Choi
(74) *Attorney, Agent, or Firm* — Janaki K. Davda; Konrad, Raynes, Davda & Victor LLP

(57) ABSTRACT

Provided are techniques for generating a Graphical User Interface (GUI) based on relationships between tables identified in a data model and displaying the GUI to enable selection of the tables and columns in the tables. Via the GUI, a selection of at least one of the tables and a selection of at least one of the columns in the at least one of the selected tables are received. A statement is generated based on the selected tables and the selected columns. The statement is executed to obtain results. The results are processed to create a data object having a hierarchical structure that indicates the relationships between the tables.

7 Claims, 12 Drawing Sheets

(56) References Cited

U.S. PATENT DOCUMENTS

| | | | | |
|---|---|---|---|---|
| 2009/0193006 | A1* | 7/2009 | Herrnstadt | 707/5 |
| 2010/0241637 | A1* | 9/2010 | Kissner et al. | 707/752 |
| 2010/0312788 | A1* | 12/2010 | Bailey | 707/769 |
| 2010/0318561 | A1* | 12/2010 | Dunie et al. | 707/769 |

OTHER PUBLICATIONS

Cheng, W., J. Li, K. Moore, and A.H. Karp, "MUPPET: Mobile Ubiquitous Privacy Protection for Electronic Transactions", © 2007 Hewlett-Packard Development Company, L.P., Total 11 pp (Also Google, Mar. 2007).

Fong, J. and F. Pang, "Converting Relational Database into XML Document", © 2001 Google/IEEE, Total 5 pp.

Guardalben, G. and S. Atre, "Integrating XML and Relational Database Technologies: A Position Paper", © 2002 HiT Software Inc., Total 24 pp (Also Google).

Pardede, E., J.W. Rahayu, and D. Taniar, "New SQL Standard for Object-Relational Database Applications", Google: 2003-2004, Total 13 pp.

Preliminary Amendment, Jul. 6, 2012, for U.S. Appl. No. 13/074,472, filed Mar. 29, 2011 by R.J. Cochrane et al., Total 5 pp.

U.S. Appl. No. 13/074,472, filed Mar. 29, 2011, entitled "Retrieving Data Objects", invented by Cochrane, R.J., R.C. Leung, and L.S.W. Mau, Total 32 pp.

Amendment 1, Dec. 31, 2012, for U.S. Appl. No. 13/074,472, filed Mar. 29, 2011 by R.J. Cochrane et al., Total 11 pp.

Office Action 1, Sep. 24, 2012, for U.S. Appl. No. 13/074,472, filed Mar. 29, 2011 by R.J. Cochrane et al. Total 17 pp.

Amendment 2, May 21, 2013, for U.S. Appl. No. 13/074,472, filed Mar. 29, 2011 by R.J. Cochrane et al., Total 12 pp.

Final Office Action 1, Feb. 22, 2013, for U.S. Appl. No. 13/074,472, filed Mar. 29, 2011 by R.J. Cochrane et al., Total 14 pp.

Office Action 3, Apr. 9, 2014, for U.S. Appl. No. 13/074,472, filed Mar. 29, 2011 by R.J. Cochrane et al., Total 14 pp.

Response to Office Action 3, Jul. 8, 2014, for U.S. Appl. No. 13/074,472, filed Mar. 29, 2011 by R.J. Cochrane et al. Total 9 pp.

Supplemental Amendment, Jul. 11, 2014, for U.S. Appl. No. 13/074,472, filed Mar. 29, 2011 by R.J. Cochrane et al., Total 7 pp.

Final Office Action 2, Jul. 18, 2014, for U.S. Appl. No. 13/074,472, filed Mar. 29, 2011 by R.J. Cochrane et al., Total 20 pp.

Response to Final Office Action 2, Oct. 20, 2014, for U.S. Appl. No. 13/074,472, filed Mar. 29, 2011 by R.J. Cochrane et al., Total 9 pp.

Notice of Allowance, Feb. 25, 2015, for U.S. Appl. No. 13/074,472, filed Mar. 29, 2011 by R.J. Cochrane et al., Total 10 pp.

* cited by examiner

```
<Books>
        <ISBN> ... </ISBN>
        <Title> ... </ISBN>
        <Pages> ... </Pages>
        <Author>
                <FirstName> ... </FirstName>
                <LastName> ... </LastName>
        </Author>
        <Author>
                <FirstName> ... </FirstName>
                <LastName> ... </LastName>
        </Author>
        <Publisher>
                <Name> ... </Name>
                <Location> ... </Location>
        </Publisher>
</Books>
```

FIG. 2

Specify the Data Object Model file

Required fields marked with *

*Input Type:   ◉ Upload File
              ○ Upload URL

*Filepath:     [C:\mashupDevV2WorkSpace\JavaMashup] [Browse...]
               Set location of the physical data model file

*Database Type: [DB2 ▼]
                Select the database type

*Host:         [mashgreen.svl.ibm.com]
               Enter the dB server host (e.g. mashgreen.svl.ibm.com)

*Port:         [50000]
               Enter the database server port (e.g. 50000)

Username:      [db2inst1]
               Enter the database access user

Password:      [••••••••]
               Enter the database access password

*Database Name [demodb]
               Enter the database name

[Previous] [Next]

FIG. 6

Select the attributes of the Data Object

Required fields marked with *

Select tables and columns to include:

Starting table:

BOOKDEMO.BOOKSUBJECT
BOOKDEMO.BOOKAUTHOR
BOOKDEMO.ZIPCODES
BOOKDEMO.BOOKS
BOOKDEMO.SUBJECT
BOOKDEMO.PUBLISHER
BOOKDEMO.AUTHOR

Check the colu...

Additional filter

| ID | Table | | e Name | |

FIG. 7

Check the columns you want to include:

- ☐ ⊞ entry
  - ☐ ⊞ BOOKDEMO.BOOKS —— 802
    - ☑ ⊞ ISBN —— 810
    - ☑ ⊞ TITLE —— 812
    - ☐ ⊞ PAGES —— 814
    - ☐ ⊞ PUBLISHERFK —— 816
    - ☐ ⊞ BOOKDEMO.BOOKAUTHOR_t2 —— 820
      - ☐ ⊞ ISBNFK
      - ☐ ⊞ AUTHORFK
      - ☐ ⊞ BOOKDEMO.BOOKS_t5
      - ☑ ⊞ BOOKDEMO.AUTHOR_t6 —— 910
        - ☑ ⊞ AUTHORID
        - ☑ ⊞ FIRSTNAME
        - ☑ ⊞ LASTNAME
        - ☐ ⊞ BOOKDEMO.BOOKAUTHOR_t7 —— 822
    - ☐ ⊞ BOOKDEMO.BOOKSUBJECT_t3 —— 822
  - ☐ ⊞ BOOKDEMO.PUBLISHER_t4 —— 824

Additional filtering criteria:

| ID | Table | Column | Comparison | Variable Name | Default Value |
|----|-------|--------|------------|---------------|---------------|
| 1 | BOOKDEMO.BOOKS ▸ | PAGES ▸ | > ▸ | numberOfPages | 100 |
| 2 | BOOKDEMO.AUTHOR_ ▸ | FIRSTNAME ▸ | = ▸ | authorFirstName | 'Clayton' |

Specify how the above criteria must be satisfied (default = all must be true)
e.g. ((1 AND 2) or 3) AND 4

```
        <BOOKDEMO.BOOKS>
    </content>
</entry>
<entry xmlns="http://www.w3.org/2005/Atom">
    <title>Item 7</title>
    <id>urn:uuid:7</id>
    <updated>2010-06-30T10:55:28.687Z</updated>
    <summary type="text">Atom Feed entry 7</summary>
    <content type="application/xml">
        <BOOKDEMO.BOOKS>
            <ISBN>1591391857</ISBN>
            <TITLE>Seeing What's Next: Using Theories of Innovation to Predict Industry Change (Hardcover)</TITLE>
            <PAGES>312</PAGES>
            <BOOKDEMO.AUTHOR>
                <AUTHORID>1</AUTHORID>
                <FIRSTNAME>Clayton</FIRSTNAME>
                <LASTNAME>Christensen</LASTNAME>
            </BOOKDEMO.AUTHOR>
            <BOOKDEMO.AUTHOR>
                <AUTHORID>6</AUTHORID>
                <FIRSTNAME>Scott</FIRSTNAME>
                <LASTNAME>Anthony</LASTNAME>
            </BOOKDEMO.AUTHOR>
            <BOOKDEMO.AUTHOR>
                <AUTHORID>5</AUTHORID>
                <FIRSTNAME>Erik</FIRSTNAME>
                <LASTNAME>Roth</LASTNAME>
            </BOOKDEMO.AUTHOR>
        </BOOKDEMO.BOOKS>
    </content>
</entry>
<entry xmlns="http://www.w3.org/2005/Atom">
    <title>Item 8</title>
    <id>urn:uuid:8</id>
```

FIG. 11

RETRIEVING DATA OBJECTS

CROSS-REFERENCE TO RELATED APPLICATION

This application is a continuation of U.S. patent application Ser. No. 13/074,472, filed on Mar. 29, 2011, which application is incorporated herein by reference in its entirety.

BACKGROUND

1. Field

Embodiments of the invention relate to retrieving data objects from a data store with hierarchical relationship information based on table relationships described in a data model.

2. Description of the Related Art

A relational database stores information in different tables. In many cases, the tables contain information that is not isolated, but, instead, is relevant to information in other tables in the relational database. The relationship between various tables can be recognized through primary and foreign key definitions. To query information through multiple related tables, users can write Structured Query Language (SQL) statements that join the relevant tables to form one result set. However, the result set returned by the SQL typically returns the data in a single dimension list of values, and the hierarchical information between these tables is lost.

For instance, consider a specific example in which a relational database contains information about books. A properly normalized relational database stores the information about these books in various related tables. One table may store the book's information, such as a title, a number of pages, and an International Standard Book Number (ISBN). Another, separate table may store the information about the one or more authors of the book, and these two tables are related using primary keys and foreign keys. There may be other tables that store information about the book's publisher's information or the subject category, etc. To retrieve the full information of the book, users need to manually write a custom SQL statement that joins the relevant table. At a high level, the SQL statement may be:

Select [book information], [author information], [publisher information], from [book table], [author table], [publisher table], where [books, author, and table] refer to the same book Executing this type of SQL statement will return a list of rows in a result set. Each row in the result set contains the value of each column that the user included in the SQL statement. The information about the "books" may be retrieved by reading the values in each of the result set rows. However, there are two main problems with this.

The first problem is that the returned information is in one single dimension, and the inherently hierarchical information about these tables is lost. For this example, it is more natural to consider the book's main information "contains" the other related information (e.g. authors, publishers). The one dimensional list lacks a description of the relationship between the values.

The second problem is that, for tables that contain one to many relationships (e.g. a book that is written by multiple authors), the relevant information is spread across multiple rows of a table. As a particular example, say Book 1 is written by Authors A and B, and Book 2 is written by Authors C and D. Then, a user wants to retrieve the book's title, the ISBN number, and the author's first name. After executing a SQL statement, the returned information is separated across multiple rows in the result set, such as the following:

Row 1: Book 1's title, Book 1's ISBN, author A's first name, author A's last name Row 2: Book 1's title, Book 1's ISBN, author B's first name, author B's last name Row 3: Book 2's title, Book 2's ISBN, author C's first name, author C's last name Row 4: Book 2's title, Book 2's ISBN, author D's first name, author D's last name Again, the relationship of values from different tables is lost in the result set.

Thus, there is a need for a technique that retrieves data objects from a data store with hierarchical relationship information.

BRIEF SUMMARY

Provided are a method, computer program product, and system for generating a Graphical User Interface (GUI) based on relationships between tables identified in a data model and displaying the GUI to enable selection of the tables and columns in the tables. Via the GUI, a selection of at least one of the tables and a selection of at least one of the columns in the at least one of the selected tables are received. A statement is generated based on the selected tables and the selected columns. The statement is executed to obtain results. The results are processed to create a data object having a hierarchical structure that indicates the relationships between the tables.

BRIEF DESCRIPTION OF THE SEVERAL VIEWS OF THE DRAWINGS

Referring now to the drawings in which like reference numbers represent corresponding parts throughout:

FIG. 2 illustrates an Extensible Markup Language (XML) tree in accordance with certain embodiments.

FIG. 6 illustrates an interface requesting user input in accordance with certain embodiments.

FIG. 7 illustrates an interface with a list of available tables for the user to begin constructing the data object in accordance with certain embodiments.

FIG. 9 illustrates an interface with an expanded related table in accordance with certain embodiments.

FIG. 10 illustrates an interface with additional filtering criteria in accordance with certain embodiments.

FIG. 11 illustrates a sample data object returned in an ATOM feed in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
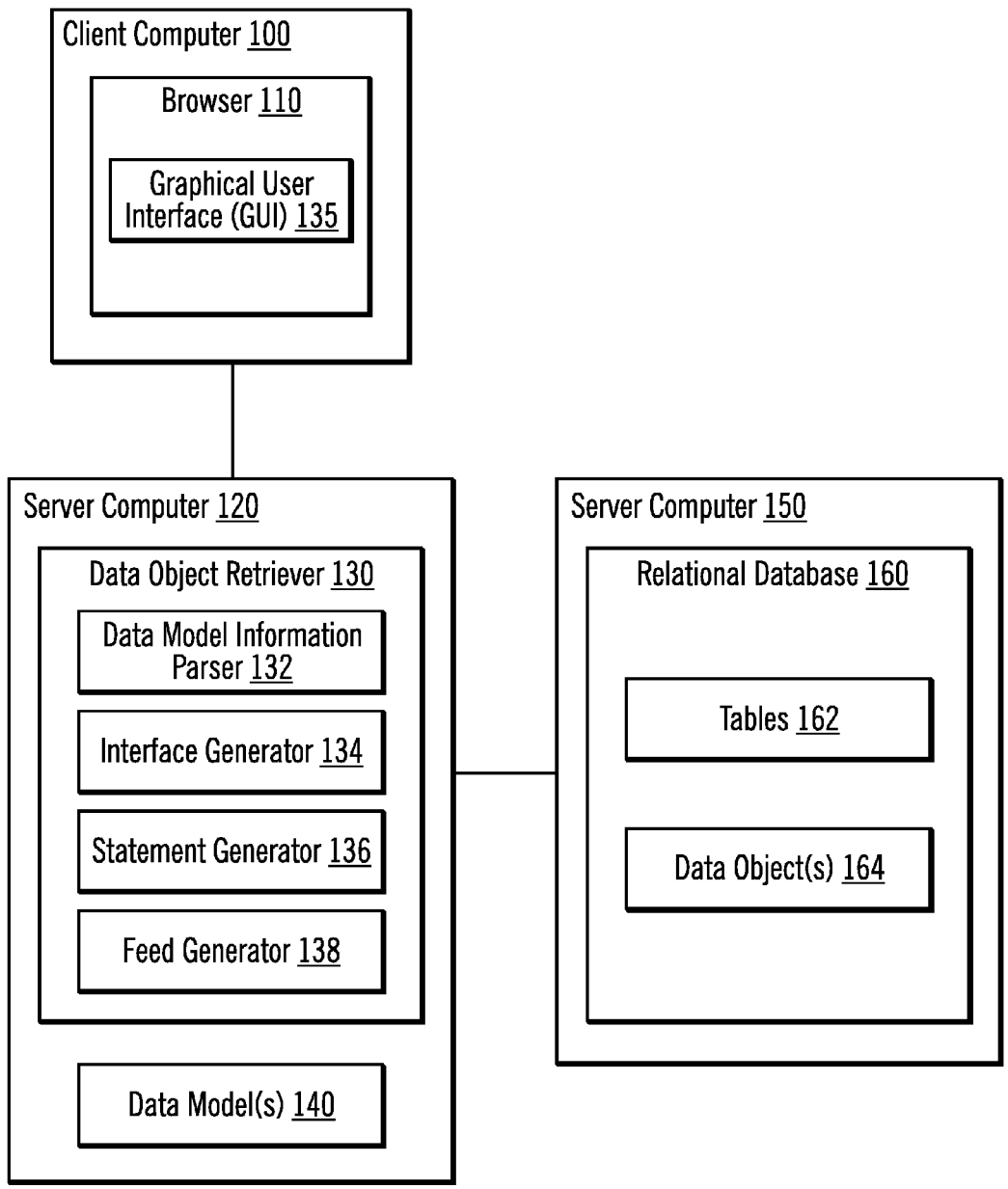
FIG. 1 illustrates a computing architecture in accordance with certain embodiments.

FIG. 1 illustrates a computing architecture in accordance with certain embodiments. A client computer 100 is coupled to a server computer 120. The server computer 120 is coupled to a server computer 150. The server computer 120 includes a data object retriever 130 and one or more data models 140. The client computer 100 includes a browser 110 that displays a Graphical User Interface (GUI) 135 provided by the data object retriever 130.

The server computer 150 includes a relational database 160, and the relational database 160 includes tables 162 containing data that defines one or more data objects 164. A data object may be described as a set of data elements (or attributes) of interest related to an object. In certain embodiments, the data objects 164 include attributes. In alternative certain embodiments, the data objects 164 include attributes as well as methods or functions to perform operations on the attributes. Data from the tables 162 together with a data model 140 represents one or more data objects 164, Although, the relational database 160 is shown at server 150, the relational database 160 may be located at the server computer 120 in certain embodiments.

The data object retriever 130 uses information regarding the table relationships (which are considered to be bidirectional) to provide a way for users to query information inside a relational database 160 and to automatically generate a list of "objects", such as a list of books. Because relationships are treated as bidirectional, a table may be related to itself, forming a cycle. For example, when a book is selected, the authors of the book may be displayed. Then, an author may be selected, and all books written by the author are displayed, including the original book that was selected.

The data object retriever 130 includes a data model information parser 132 to analyze the relationship information of relevant tables. The data object retriever 130 includes an interface generator 134 that generates a GUI 135 to enable users to provide information and to specify query criteria, such as what information to include in the data object 164. The data object retriever 130 includes a statement generator 136 to automatically create the desired statement (e.g., a SQL statement) based on information provided from the data model information parser 132 and user provided information via the GUI 135 from the interface generator 134. The data object retriever 130 includes a feed generator that runs the statement, processes the data returned from the relational database 160, and formats the result properly for the end user as a feed accessible through a Uniform Resource Locator (URL). In certain embodiments, a feed may be described as a data format (e.g., an XML data format) used for providing users with content. In certain embodiments, the feed is an ATOM feed.

The data model information parser 132, the interface generator 134, the statement generator 136, and the feed generator 138 of the data object retriever 130 provide a way for the user to retrieve data from multiple related tables from the relational database 160, without writing statements to retrieve the data manually. In addition, the data object retriever 130 allows the user to obtain a data object that maintains the hierarchical information structure of the data.

That is, the data object retriever 130 provides users a way to retrieve a data object 164 that maintains hierarchical relationships between information in the tables 162. As a particular example, say Book 1 is written by Authors A and B, and Book 2 is written by Authors C and D. Then, a user wants to retrieve the book's title, the ISBN number, and the author's first name. In this example, the core "object" of information is a book, and embodiments provide a result set, as a data object, that is more natural to the user by grouping together the information relevant to a particular "object" in one piece and by representing the information in a way that maintains the hierarchy of the information, such as the Extensible Markup Language (XML) tree illustrated in FIG. 2 in accordance with certain embodiments.

In certain embodiments, the data model information parser 132, the interface generator 134, the statement generator 136, and the feed generator 138 of the data object retriever 130 are provided as a plug-in. That is, the plug-in integrates the data model information parser 132, the interface generator 134, the statement generator 136, and the feed generator 138 into one seamless interface for the user to retrieve result sets, as data objects, as an ATOM feed. In certain embodiments, to use the plug-in, the user obtains a data model 140.

Figure 3:
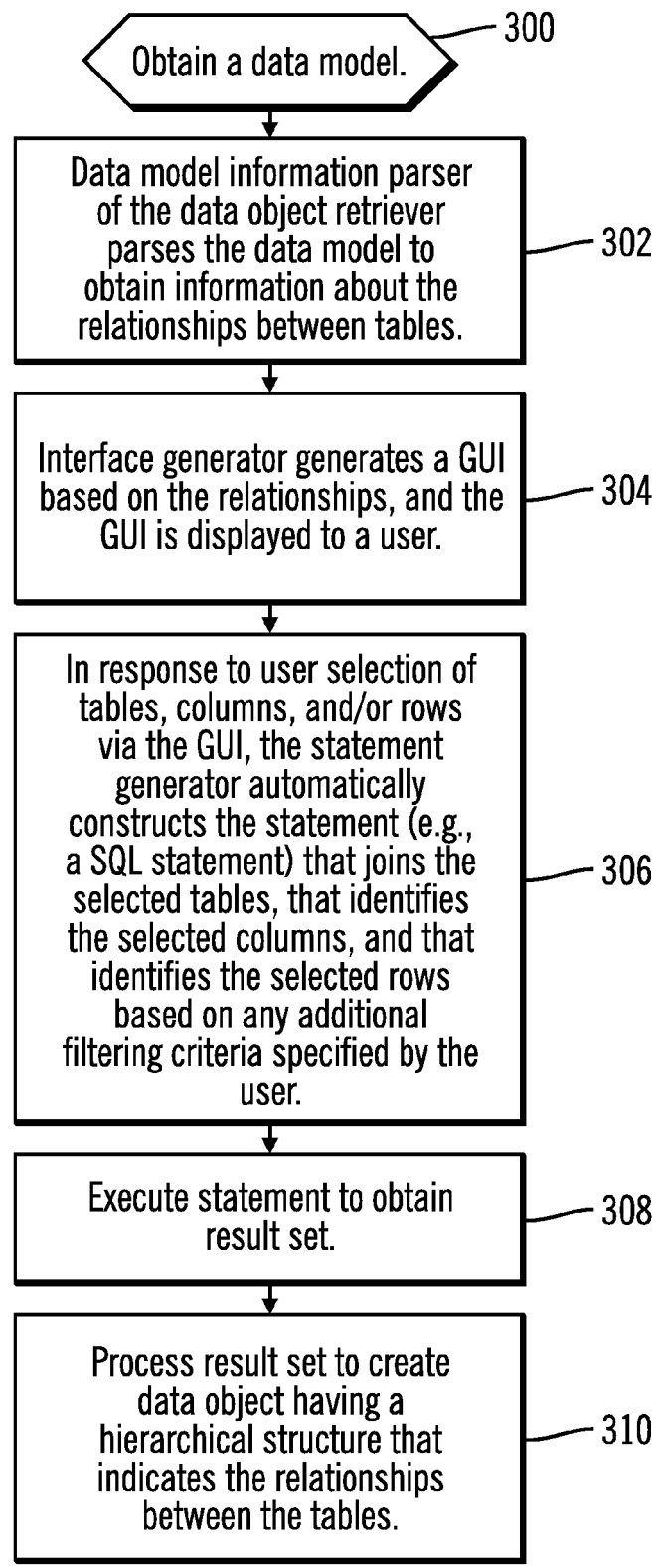
FIG. 3 illustrates logic performed by a data object retriever in accordance with certain embodiments.

FIG. 3 illustrates logic performed by the data object retriever 130 in accordance with certain embodiments. Control begins at block 300 with the data object retriever 130 obtaining a data model 140 in response to user input. In certain embodiments, the data model 140 is generated with existing tools.

In block 302, the data model information parser 132 of the data object retriever 130 parses the data model to obtain information about the relationships between in the tables 162. In block 304, the interface generator 134 generates a GUI 135 based on the relationships. In certain embodiments, the GUI 135 is displayed at the client computer 100. In block 306, in response to user selection of tables, columns, and/or rows via the GUI 135, the statement generator 136 of the data object retriever 130 automatically constructs the statement (e.g., a SQL statement) that joins the selected tables, that identifies the selected columns, and that identifies the selected rows based on any additional filtering criteria specified by the user. In certain embodiments, the statement generator 136 generates unambiguous filter criteria for multiple references of a same table. For example, when a book is selected, the authors of the book may be displayed; then, an author may be selected, and all books written by the author are displayed. Thus, there may be filter criteria at each selection.

In block 308, the feed generator 138 of the data object retriever 130 executes the statement to obtain result set. In block 310, the feed generator 138 of the data object retriever 130 processes the result set to create a data object 164 having a hierarchical structure that indicates the relationships between the tables. In certain embodiments, the data object 164 is returned as an ATOM feed.

Figure 4:
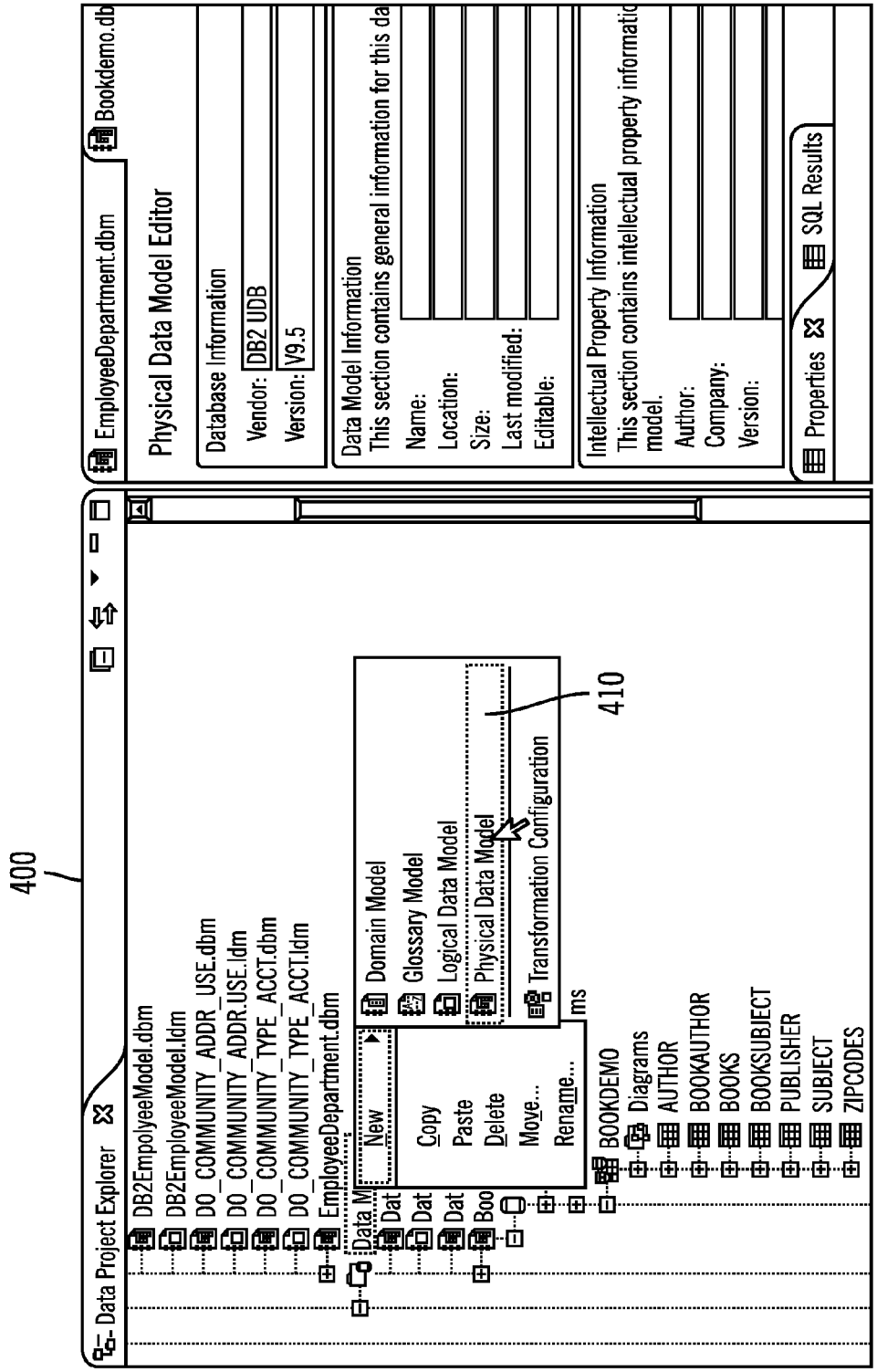
FIG. 4 illustrates an interface used to generate a physical data model in accordance with certain embodiments.

FIG. 4 illustrates an interface 400 used to generate the physical data model in accordance with certain embodiments. In FIG. 4, a new physical data model 410 has been selected. An item may be shown as selected in the figures by enclosing the item in a dashed box.

Figure 5:
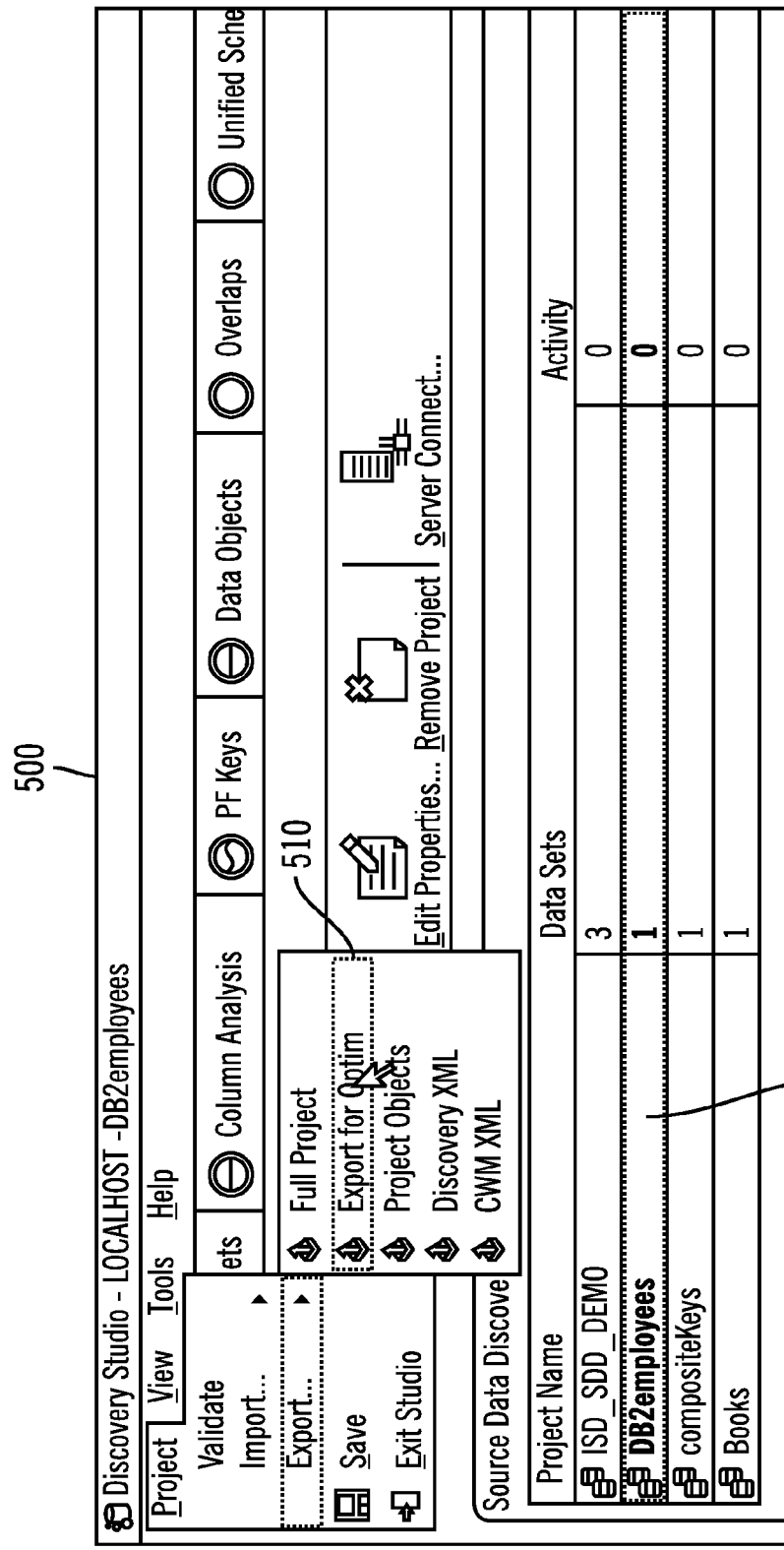
FIG. 5 illustrates an interface for exporting the data model file in accordance with certain embodiments.

FIG. 5 illustrates an interface 500 for exporting the data model file in accordance with certain embodiments. In FIG. 5, an export option 510 has been selected for the selected DB2Employees project 520.

Once the data model file has been obtained, the data model file is used as input by the data object retriever 130. The data object retriever 130 asks the user for this data model file and other information (e.g., such as a host name, a port, a user name, and a password) to access a database source. FIG. 6 illustrates an interface 600 requesting user input in accordance with certain embodiments.

Once the user provides this information, the data model information parser 132 analyzes the data model file. This data model file contains detailed information such as:

Information about the database
A list of the tables relevant to this data model
For each table, a list of columns and the column details, such as name and data type
A list of constraints for each table, such as primary key and foreign key information In certain embodiments, the data model information parser 132 may use Eclipse Modeling Framework Project (EMF) JAVA libraries to parse through the data and loads the parsed information into memory as JAVA objects. (JAVA is a trademark or registered trademark of Oracle and/or its affiliates.)

The interface generator 134 generates the GUI 135 illustrated in FIGS. 7-10, which are presented to the user, so that the user can select attributes to include in the data object based on the table relationships, in accordance with certain embodiments. In particular, a user can select columns to be included as attributes of the resulting data objects. Thus, the data object 164 may be instantiated (created) with a subset of attributes.

FIG. 7 illustrates an interface 700 with a list of available tables for the user to begin constructing the data object in accordance with certain embodiments. In FIG. 7, the user first selects a "starting table" from a drop down list in the interface 700 to begin construction of the data object.

Figure 8:
FIG. 8 illustrates an interface with a sample tree structure that shows the starting table and the related tables in a data model file in accordance with certain embodiments.

FIG. 8 illustrates an interface 800 with a sample hierarchical (e.g., tree) structure that shows the starting table and the related tables in a data model file in accordance with certain embodiments. With reference to FIG. 8, all relationships are treated as bidirectional. Once the user has selected a "starting table" in interface 700, a hierarchical structure that shows the available columns 810, 812, 814, 816 of the starting table 802 and that shows other related tables 820, 822, 824 is displayed in the interface 800, FIG. 8. Tables related to the starting table are also displayed as unexpanded child nodes that are expandable. Since a table could be related to itself (directly or indirectly), in certain embodiments, no automatic expansion is done. When the user expands a related table, the user will see the columns for this table, as well as, tables related to this just expanded table. To include a particular column, the user simply checks the box next to the column name in the interface 800. FIG. 9 illustrates an interface 900 with an expanded related table in accordance with certain embodiments. In FIG. 9, the related table 820 has been expanded, and columns of table 820, as well as, tables related to table 820 are illustrated. The user has selected table 910 and columns of table 910.

After the user has selected the desired columns to include in the data object, the GUI 135 also allows the user to specify additional criteria to select rows of tables. For example, the user can choose to only include books that are over a certain number of pages or only books written by a certain author. FIG. 10 illustrates an interface 1000 with additional filtering criteria in accordance with certain embodiments. In FIG. 10, filtering criteria 1010 selects rows for books that have more than 100 pages. Also, filtering criteria 1020 selects rows for books whose author's first name is "Clayton". The user is also able to specify in box 1030 whether the filtering criteria should be combined using "ANDs" or "ORs".

Based on the information gathered from the GUI 135, the statement generator 136 automatically constructs the statement (e.g., a SQL statement) that joins the selected tables, identifies the selected columns, and identifies the selected rows based on additional filtering criteria. This statement is passed to the feed generator 138. The following is an example SQL statement that may be generated by the statement generator 136:

```
SELECT t1.ISBN as "t1_ISBN", t1.TITLE as "t1_TITLE",
t6.AUTHORID as "t6_AUTHORID", t6.FIRSTNAME as
"t6_FIRSTNAME", t6.LASTNAME as "t6_LASTNAME"
FROM BOOKDEMO.BOOKS t1, BOOKDEMO.BOOKAUTHOR t2,
BOOKDEMO.AUTHOR t6
WHERE t1.ISBN = t2.ISBNFK and t2.AUTHORFK = t6.AUTHORID
and (((t1.PAGES > ? ) OR (t6.FIRSTNAME = ? )))
```

The feed generator 138 executes the statement, processes the returned results, constructs the data object 164, and returns the data object 164 to the user. The data object 164 returned to the user has a hierarchical structure that indicates the relationships between the tables that were selected. In certain embodiments, the data object 164 is returned as an ATOM feed. Then, for the user to retrieve this feed, the user uses the URL to the feed.

FIG. 11 illustrates a sample data object returned in an ATOM feed 1100 in accordance with certain embodiments. The data object of FIG. 11 has a hierarchical structure that indicates the relationships between the tables that were selected.

Thus, embodiments retrieve data objects from a relational database 160 based on table relationships described in a data model and represent the data object in a hierarchical data format (e.g., XML). Embodiments allow users to define a data object by selecting from a tree displayed in a GUI. Embodiments build an XML template for data retrieved from a relational database 160.

Thus, instead of having a one dimensional list, embodiments provide a structure that maintains the hierarchy of information, such as in an XML tree, to present data to the user in a way that more closely describes the relationships between the values in different tables.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The data object retriever 130 may be implemented as hardware (e.g., hardware logic or circuitry), software, or a combination of hardware and software.

Figure 12:
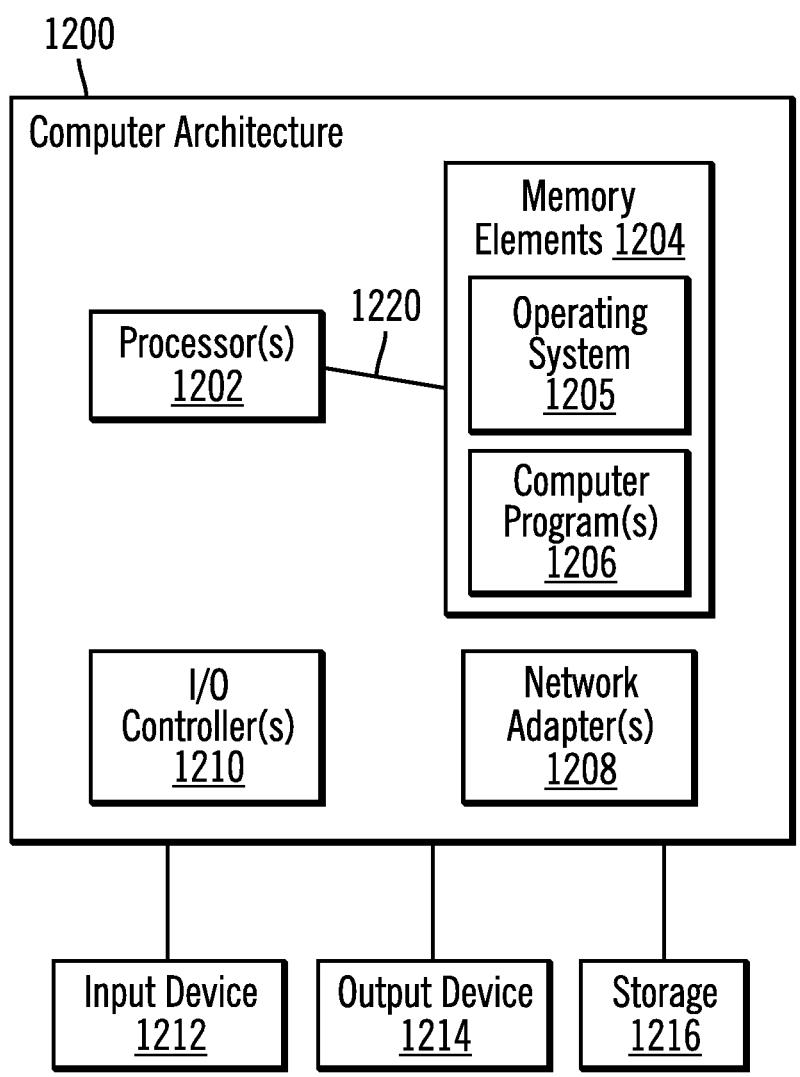
FIG. 12 illustrates a computer architecture that may be used in accordance with certain embodiments.

FIG. 12 illustrates a computer architecture 1200 that may be used in accordance with certain embodiments. Client computer 100, server computer 120, and/or server computer 150 may implement computer architecture 1200. The computer architecture 1200 is suitable for storing and/or executing program code and includes at least one processor 1202 coupled directly or indirectly to memory elements 1204 through a system bus 1220. The memory elements 1204 may include local memory employed during actual execution of the program code, bulk storage, and cache memories which provide temporary storage of at least some program code in order to reduce the number of times code must be retrieved from bulk storage during execution. The memory elements 1204 include an operating system 1205 and one or more computer programs 1206.

Input/Output (I/O) devices 1212, 1214 (including but not limited to keyboards, displays, pointing devices, etc.) may be coupled to the system either directly or through intervening I/O controllers 1210.

Network adapters 1208 may also be coupled to the system to enable the data processing system to become coupled to other data processing systems or remote printers or storage devices through intervening private or public networks. Modems, cable modem and Ethernet cards are just a few of the currently available types of network adapters 1208.

The computer architecture 1200 may be coupled to storage 1216 (e.g., a non-volatile storage area, such as magnetic disk drives, optical disk drives, a tape drive, etc.). The storage 1216 may comprise an internal storage device or an attached or network accessible storage. Computer programs 1206 in storage 1216 may be loaded into the memory elements 1204 and executed by a processor 1202 in a manner known in the art.

The computer architecture 1200 may include fewer components than illustrated, additional components not illustrated herein, or some combination of the components illustrated and additional components. The computer architecture 1200 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
   obtaining, using a processor of a computer, information about relationships between values in tables stored in a database;
   in response to receiving selection of a first table, displaying a hierarchical tree structure with the selected first table, columns of the selected first table that each has a selection indicator located adjacent to a column name for that column, and one or more related tables that each has a selection indicator and an expansion indicator located adjacent to a table name for that related table;
   receiving, via the hierarchical tree structure, a selection of a related table from the one or more related tables using the selection indicator for the related table, a column from the columns in the selected first table to be included as an attribute in a data object using the selection indicator for the column in the selected first table, and a column from columns in the selected related table to be included as another attribute in the data object using a selection indicator for the column in the selected related table;
   generating a statement based on the selected first table, the selected related table, the selected column in the selected first table, and the selected column in the selected related table; and
   executing the statement to create the data object having a hierarchical tree structure that indicates the relationships between the values of the selected column in the selected first table and the selected column in the selected related table.

2. The method of claim 1, further comprising:
   obtaining the data model and
   parsing the data model to obtain information about the relationships between the values in the tables stored in the database.

3. The method of claim 1, further comprising:
   receiving filtering criteria that selects rows in the selected first table and the selected related table;
   in response to the received filtering criteria, generating filter criteria for one or more references of the selected first table and the selected related table; and
   generating the statement based on the selected first table, the selected related table, the selected column in the selected first table, the selected column in the selected related table, and the received filtering criteria.

4. The method of claim 3, wherein the statement is a Structured Query Language (SQL) statement that identifies the selected column in the selected first table, that identifies the selected column in the selected related table, that identifies the selected rows, and that joins the selected first table and the selected related table.

5. The method of claim 1, further comprising:
   returning the data object as a web feed; and
   in response to the user selecting the web feed, displaying the data object.

6. The method of claim 5, wherein the web feed comprises an ATOM feed.

7. The method of claim 1, wherein the relationships include cyclic relationships.

* * * * *